US012614541B2

(12) United States Patent
Sun et al.

(10) Patent No.: US 12,614,541 B2
(45) Date of Patent: Apr. 28, 2026

(54) SYSTEMS AND METHODS FOR MACHINE-LEARNING BASED MULTI-LINGUAL PRONUNCIATION GENERATION

(71) Applicant: JPMORGAN CHASE BANK, N.A., New York, NY (US)

(72) Inventors: Pheobe Sun, London (GB); Alexandru-Petre Cazan, Mumbai Suburban (IN); Ruibo Shi, London (GB); Sean Moran, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 193 days.

(21) Appl. No.: 18/496,313

(22) Filed: Oct. 27, 2023

(65) Prior Publication Data

US 2024/0153485 A1     May 9, 2024

Related U.S. Application Data

(60) Provisional application No. 63/382,823, filed on Nov. 8, 2022.

(51) Int. Cl.
*G10L 13/047* (2013.01)
*H04L 12/18* (2006.01)

(52) U.S. Cl.
CPC ........ *G10L 13/047* (2013.01); *H04L 12/1813* (2013.01)

(58) Field of Classification Search
CPC ............... G10L 13/047; H04L 12/1813; H04L 12/1827; G09B 19/06

USPC .......................................................... 704/258
See application file for complete search history.

(56) References Cited

U.S. PATENT DOCUMENTS

| | | | | |
|---|---|---|---|---|
| 6,708,150 B1 * | 3/2004 | Hirayama | ............... | G10L 15/26 |
| | | | | 704/E15.045 |
| 7,092,870 B1 * | 8/2006 | Chen | ..................... | G06F 16/313 |
| | | | | 707/E17.084 |
| 7,292,980 B1 * | 11/2007 | August | .................. | G10L 15/063 |
| | | | | 704/254 |
| 7,487,096 B1 * | 2/2009 | Cox | ...................... | G10L 15/187 |
| | | | | 704/277 |
| 8,408,913 B2 * | 4/2013 | Palacios | ................... | G09B 5/06 |
| | | | | 434/156 |

(Continued)

*Primary Examiner* — Thuykhanh Le
(74) *Attorney, Agent, or Firm* — GREENBERG TRAURIG LLP

(57) ABSTRACT

Systems and methods for machine-learning based multi-lingual pronunciation generation are disclosed. A method for machine-learning based multi-lingual pronunciation generation may include: (1) training a language origin prediction machine learning model; (2) training a pronunciation generator machine learning model; (3) receiving, by a pronunciation computer program, a word for pronunciation guidance; (4) predicting, by the pronunciation computer program and using the trained language origin prediction machine learning model, a language origin of the word; (5) predicting, by the pronunciation computer program and using the trained pronunciation generator machine learning model and the language origin, a syllable-by-syllable pronunciation for the word; and (6) returning, by the pronunciation computer program, the syllable-by-syllable pronunciation.

16 Claims, 3 Drawing Sheets

(56)                References Cited

U.S. PATENT DOCUMENTS

| | | | | |
|---|---|---|---|---|
| 8,510,112 | B1* | 8/2013 | Conkie | G10L 13/06 |
| | | | | 704/270.1 |
| 9,275,637 | B1* | 3/2016 | Salvador | G10L 15/06 |
| 9,471,566 | B1* | 10/2016 | Zhang | G06F 3/0237 |
| 9,916,295 | B1* | 3/2018 | Crawford | G06F 40/166 |
| 11,024,199 | B1* | 6/2021 | Treves | G09B 5/02 |
| 11,810,548 | B2* | 11/2023 | Kim | G06N 3/0464 |
| 12,027,059 | B1* | 7/2024 | Bloch | G06V 20/40 |
| 2002/0013707 | A1* | 1/2002 | Shaw | G10L 15/063 |
| | | | | 704/257 |
| 2002/0086269 | A1* | 7/2002 | Shpiro | G09B 19/06 |
| | | | | 434/156 |
| 2003/0170595 | A1* | 9/2003 | Thompson | G09B 1/00 |
| | | | | 434/159 |
| 2003/0225580 | A1* | 12/2003 | Lin | G09B 5/04 |
| | | | | 704/E15.045 |
| 2003/0232312 | A1* | 12/2003 | Newsom | G09B 19/08 |
| | | | | 434/156 |
| 2005/0071165 | A1* | 3/2005 | Hofstader | G10L 13/0335 |
| | | | | 704/271 |
| 2005/0159954 | A1* | 7/2005 | Chu | G10L 15/02 |
| | | | | 704/254 |
| 2005/0203738 | A1* | 9/2005 | Hwang | G10L 15/063 |
| | | | | 704/243 |
| 2005/0203739 | A1* | 9/2005 | Hwang | G10L 13/08 |
| | | | | 704/254 |
| 2005/0256715 | A1* | 11/2005 | Okimoto | G06F 40/216 |
| | | | | 704/E15.023 |
| 2006/0003297 | A1* | 1/2006 | Wiig | G09B 19/04 |
| | | | | 434/236 |
| 2006/0100871 | A1* | 5/2006 | Choi | G01C 21/3608 |
| | | | | 704/E15.04 |
| 2006/0110711 | A1* | 5/2006 | Julia | G09B 19/04 |
| | | | | 434/156 |
| 2006/0110712 | A1* | 5/2006 | Julia | G09B 19/06 |
| | | | | 434/156 |
| 2007/0124133 | A1* | 5/2007 | Wang | G06F 40/44 |
| | | | | 704/10 |
| 2007/0239455 | A1* | 10/2007 | Groble | G10L 13/08 |
| | | | | 704/260 |
| 2007/0255570 | A1* | 11/2007 | Annaz | G09B 19/06 |
| | | | | 704/270 |
| 2008/0052064 | A1* | 2/2008 | Kim | G06F 40/129 |
| | | | | 707/E17.103 |
| 2008/0120108 | A1* | 5/2008 | Soong | G10L 15/18 |
| | | | | 382/187 |
| 2009/0048843 | A1* | 2/2009 | Nitisaroj | G10L 15/1807 |
| | | | | 704/260 |
| 2009/0258333 | A1* | 10/2009 | Yu | G09B 19/06 |
| | | | | 434/157 |
| 2009/0291419 | A1* | 11/2009 | Uekawa | G09B 19/06 |
| | | | | 434/185 |
| 2009/0295734 | A1* | 12/2009 | Hendrickson | G06F 3/0321 |
| | | | | 345/169 |
| 2011/0093259 | A1* | 4/2011 | Saffer | G10L 15/06 |
| | | | | 704/E11.001 |
| 2011/0238412 | A1* | 9/2011 | Ezzat | G10L 15/187 |
| | | | | 704/10 |
| 2011/0282650 | A1* | 11/2011 | Jennings | G10L 21/04 |
| | | | | 704/E15.005 |
| 2012/0034581 | A1* | 2/2012 | Chang | G09B 19/06 |
| | | | | 434/157 |
| 2012/0164609 | A1* | 6/2012 | Kehoe | G09B 19/06 |
| | | | | 434/157 |
| 2012/0164611 | A1* | 6/2012 | O | G09B 5/06 |
| | | | | 434/167 |
| 2012/0290302 | A1* | 11/2012 | Yang | G10L 15/08 |
| | | | | 704/E15.005 |
| 2012/0322034 | A1* | 12/2012 | Renduchintala | G09B 19/06 |
| | | | | 434/157 |
| 2013/0325448 | A1* | 12/2013 | Levien | G10L 19/00 |
| | | | | 704/201 |
| 2015/0106082 | A1* | 4/2015 | Ge | G10L 15/063 |
| | | | | 704/10 |
| 2015/0255069 | A1* | 9/2015 | Adams | G10L 15/08 |
| | | | | 704/236 |
| 2016/0133155 | A1* | 5/2016 | Lee | G09B 19/06 |
| | | | | 434/157 |
| 2016/0188727 | A1* | 6/2016 | Waibel | G06F 16/9535 |
| | | | | 707/758 |
| 2016/0307453 | A1* | 10/2016 | Pemba | G09B 5/065 |
| 2016/0321953 | A1* | 11/2016 | Kang | G09B 19/04 |
| 2017/0154546 | A1* | 6/2017 | Butler | G10L 15/187 |
| 2017/0236447 | A1* | 8/2017 | Stalling | G09B 19/08 |
| | | | | 434/157 |
| 2017/0287356 | A1* | 10/2017 | Stephen | G09B 7/06 |
| 2017/0358293 | A1* | 12/2017 | Chua | G10L 13/0335 |
| 2018/0075844 | A1* | 3/2018 | Kim | G10L 15/065 |
| 2018/0189259 | A1* | 7/2018 | Merl | G06F 40/263 |
| 2018/0190269 | A1* | 7/2018 | Lokeswarappa | G09B 19/06 |
| 2018/0268728 | A1* | 9/2018 | Burdis | G09B 7/04 |
| 2018/0268732 | A1* | 9/2018 | Thiel | G09B 17/02 |
| 2018/0330715 | A1* | 11/2018 | Lee | G06F 40/20 |
| 2018/0330729 | A1* | 11/2018 | Golipour | G10L 15/26 |
| 2018/0350345 | A1* | 12/2018 | Naik | G10L 15/187 |
| 2019/0013009 | A1* | 1/2019 | Pinson | G10L 25/30 |
| 2019/0066682 | A1* | 2/2019 | Cheng | G10L 15/26 |
| 2019/0115039 | A1* | 4/2019 | Du | H04R 1/222 |
| 2019/0189027 | A1* | 6/2019 | Begert | G09B 19/06 |
| 2019/0303797 | A1* | 10/2019 | Javali | G10L 15/22 |
| 2019/0341047 | A1* | 11/2019 | Du | G10L 15/1822 |
| 2019/0363959 | A1* | 11/2019 | Rice | G06Q 10/04 |
| 2020/0117713 | A1* | 4/2020 | Ray | G10L 13/10 |
| 2020/0260186 | A1* | 8/2020 | Stachura | G10L 15/30 |
| 2020/0342852 | A1* | 10/2020 | Kim | G06N 3/044 |
| 2021/0097976 | A1* | 4/2021 | Chicote | G06N 3/0442 |
| 2021/0124803 | A1* | 4/2021 | Alloh | G06F 40/247 |
| 2021/0125602 | A1* | 4/2021 | Hakata | G10L 25/60 |
| 2021/0174789 | A1* | 6/2021 | Hwang | G10L 15/22 |
| 2021/0225198 | A1* | 7/2021 | Cummings | G10L 15/22 |
| 2021/0304771 | A1* | 9/2021 | Lin | G10L 15/222 |
| 2021/0319712 | A1* | 10/2021 | Kim | G09B 5/06 |
| 2021/0327431 | A1* | 10/2021 | Stewart | G06V 40/45 |
| 2021/0334299 | A1* | 10/2021 | Sonntag | G06F 40/263 |
| 2021/0350784 | A1* | 11/2021 | Selvaggi | G10L 13/047 |
| 2021/0407515 | A1* | 12/2021 | Hermanns | G10L 15/26 |
| 2022/0035867 | A1* | 2/2022 | Tambi | G06F 40/263 |
| 2022/0036759 | A1* | 2/2022 | Proudfoot | G06F 40/242 |
| 2022/0138420 | A1* | 5/2022 | Tanaka | G10L 15/02 |
| | | | | 704/9 |
| 2022/0138426 | A1* | 5/2022 | Jung | G06F 40/30 |
| | | | | 704/9 |
| 2022/0328034 | A1* | 10/2022 | Tv | G06F 40/30 |
| 2022/0351715 | A1* | 11/2022 | Freed | G10L 13/08 |
| 2022/0375453 | A1* | 11/2022 | Zhang | G10L 13/033 |
| 2022/0375456 | A1* | 11/2022 | Yang | G06T 13/00 |
| 2023/0115538 | A1* | 4/2023 | Hoscilowicz | G10L 15/10 |
| | | | | 704/231 |
| 2023/0223025 | A1* | 7/2023 | Kawano | G02B 27/017 |
| | | | | 704/235 |
| 2023/0298564 | A1* | 9/2023 | Fang | G10L 13/047 |
| | | | | 704/260 |
| 2023/0325421 | A1* | 10/2023 | Kalekar | G06F 16/3337 |
| | | | | 704/9 |
| 2023/0386446 | A1* | 11/2023 | Lahr | G10L 13/0335 |
| 2024/0013790 | A1* | 1/2024 | Li | G10L 15/02 |
| 2024/0021183 | A1* | 1/2024 | Iriyama | G10G 1/00 |
| 2024/0119862 | A1* | 4/2024 | Zheng | G10L 25/18 |
| 2024/0153484 | A1* | 5/2024 | Rosenberg | G10L 13/047 |
| 2025/0087190 | A1* | 3/2025 | Iriyama | G10L 13/033 |
| 2025/0285555 | A1* | 9/2025 | Park | G09B 19/06 |
| 2025/0349226 | A1* | 11/2025 | Stephen | G06F 40/166 |

* cited by examiner

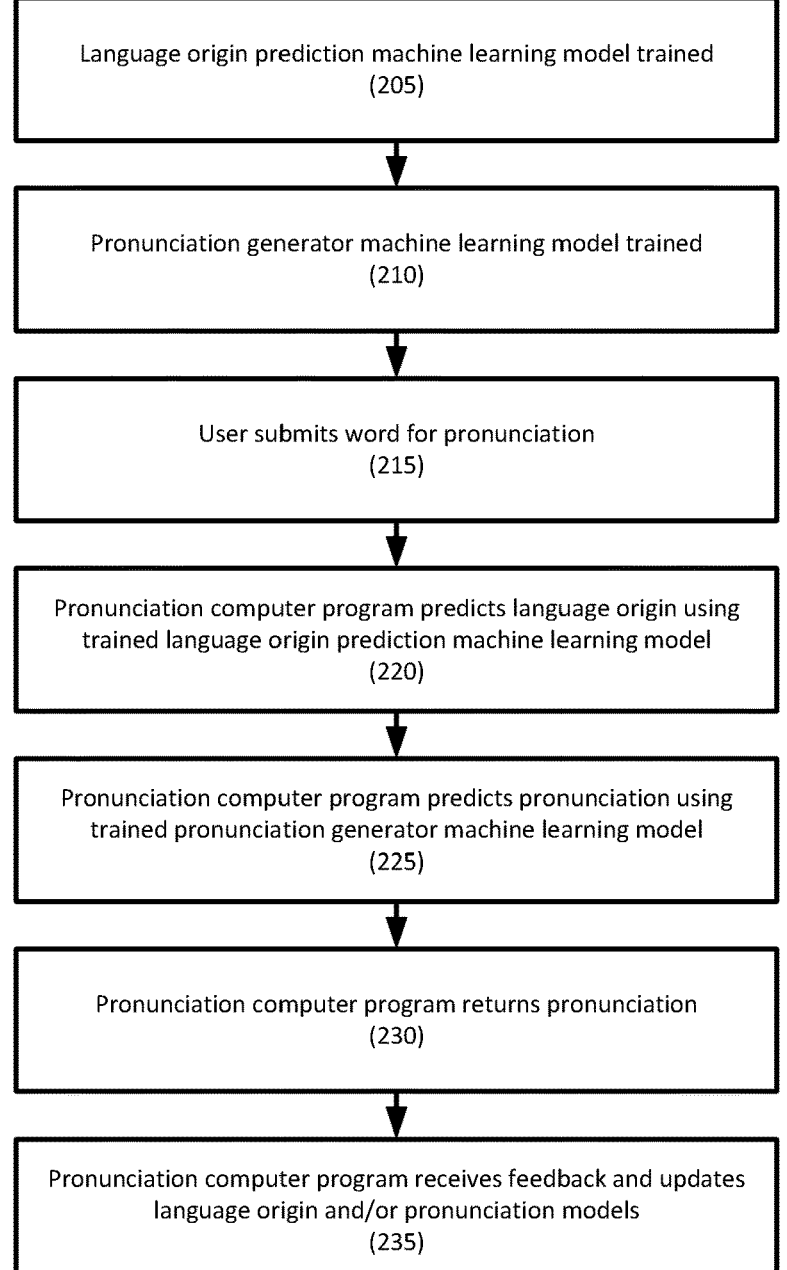

Language origin prediction machine learning model trained
(205)

Pronunciation generator machine learning model trained
(210)

User submits word for pronunciation
(215)

Pronunciation computer program predicts language origin using
trained language origin prediction machine learning model
(220)

Pronunciation computer program predicts pronunciation using
trained pronunciation generator machine learning model
(225)

Pronunciation computer program returns pronunciation
(230)

Pronunciation computer program receives feedback and updates
language origin and/or pronunciation models
(235)

FIGURE 2

SYSTEMS AND METHODS FOR MACHINE-LEARNING BASED MULTI-LINGUAL PRONUNCIATION GENERATION

RELATED APPLICATIONS

This application claims priority to, and the benefit of, U.S. Provisional Patent Application Ser. No. 63/382,823, filed Nov. 8, 2023, the disclosure of which is hereby incorporated, by reference, in its entirety.

BACKGROUND OF THE INVENTION

1. Field of the Invention

Embodiments relate to systems and methods for machine-learning based multi-lingual pronunciation generation.

2. Description of the Related Art

Names of non-Latin origin are often difficult for non-native speakers to pronounce. Although all can spell all names in Latin forms, the pronunciation does not follow the English pronunciation rules. For example, Juan is pronounced as "h-wu-an" and Aoife is pronounced as "ee-fuh".

Existing pronunciation tools are based on existing dictionary or a combination of multiple dictionaries, or crowd-sourced user-uploaded data. It is, however, impossible to include all the names in the world in these tools. These tools cannot return any results/hint/helper when the name does not exist in their database.

SUMMARY OF THE INVENTION

Systems and methods for machine-learning based multi-lingual pronunciation generation are disclosed. According to one embodiment, a method for machine-learning based multi-lingual pronunciation generation may include: (1) training a language origin prediction machine learning model; (2) training a pronunciation generator machine learning model; (3) receiving, by a pronunciation computer program, a word for pronunciation guidance; (4) predicting, by the pronunciation computer program and using the trained language origin prediction machine learning model, a language origin of the word; (5) predicting, by the pronunciation computer program and using the trained pronunciation generator machine learning model and the language origin, a syllable-by-syllable pronunciation for the word; and (6) returning, by the pronunciation computer program, the syllable-by-syllable pronunciation.

In one embodiment, the word may be a name.

In one embodiment, the language origin prediction machine learning model and/or the pronunciation generator machine learning model are trained using supervised learning.

In one embodiment, the method may also include: receiving, by the pronunciation computer program, feedback; and re-training the language origin prediction machine learning model and/or the pronunciation generator machine learning model using the feedback.

In one embodiment, the word may be received at an application executed by a user electronic device that is in communication with the pronunciation computer program. The application may output audio of the syllable-by-syllable pronunciation and/or text of the syllable-by-syllable pronunciation.

In one embodiment, the pronunciation computer program may be integrated into a videoconferencing computer program.

In one embodiment, a plurality of trained pronunciation generator machine learning models are trained, and each of the trained pronunciation generator machine learning model may be specific to a language. The pronunciation computer program may select one of the plurality of trained pronunciation generator machine learning models for the language origin.

According to another embodiment, a system may include a trained language origin prediction machine learning model; a trained pronunciation generator machine learning model; and an electronic device executing a pronunciation computer program that may be configured to receive a word for pronunciation guidance, to predict using the trained language origin prediction machine learning model, a language origin of the word, to predict, using the trained pronunciation generator machine learning model and the language origin, a syllable-by-syllable pronunciation of the word, and to output the syllable-by-syllable pronunciation.

In one embodiment, the word may be a name.

In one embodiment, the trained language origin prediction machine learning model and/or the trained pronunciation generator machine learning model are trained using supervised learning.

In one embodiment, the pronunciation computer program may be further configured to receive feedback and to retrain the trained language origin prediction machine learning model and/or the trained pronunciation generator machine learning model using the feedback.

In one embodiment, the system may also include a user electronic device executing an application, wherein application may be configured to receive the word. The application may output audio of the syllable-by-syllable pronunciation and/or text of the syllable-by-syllable pronunciation.

In one embodiment, the pronunciation computer program may be integrated into a videoconferencing computer program.

In one embodiment, a plurality of trained pronunciation generator machine learning models are trained, and each of the trained pronunciation generator machine learning model may be specific to a language, and the pronunciation computer program may be further configured to select one of the plurality of trained pronunciation generator machine learning models for the language origin.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 2 depicts a method for machine-learning based multi-lingual pronunciation generation according to an embodiment.

DETAILED DESCRIPTION OF PREFERRED EMBODIMENTS

Embodiments relate to systems and methods for machine-learning based multi-lingual pronunciation generation.

Similarly spelled names can be from different languages, therefore having different pronunciation rules. Embodiments predict the most likely language origin of the input name using a trained machine learning-based model.

Instead of using a finite dictionary, embodiments are directed to a name pronunciation generator that uses machine learning models. Thus, unlike existing pronunciation platforms, embodiments do not return a "results not found" message in a response to an input not matching an entry in a database.

Embodiments are directed to an end-to-end solution that provides multi-lingual name pronunciations without having the user select the language for the pronunciation. For example, embodiments may include a language origin prediction module that automates the language detection process. This results in a higher accuracy in the pronunciation generated.

Because it is a machine learning-based solution, embodiments may be constantly improved and tailored.

Embodiments may save people time and effort in searching for individual's name pronunciation in multiple locations. Instead, embodiments provide a single source for pronunciation information.

Embodiments eliminate the need for users to check other websites in real-time video conference calls to learn a pronunciation. Embodiments do not require the user to specify the language origin. Embodiments may provide the pronunciation in text and do not require the user to hear the pronunciation (e.g., using a speaker or headphones).

Embodiments may reduce errors/awkwardness in all meetings when people need to address each other.

Embodiments may be constantly improved or tailored to specific user scenarios by fine-tuning the machine learning model (e.g., to fine-tune our model based on a corporate employees' names).

Embodiments may be used as a stand-alone application at, for example, conferences or gatherings. Embodiments may be used, for example by hosts, speakers, etc. to read out people's names (e.g., guests, presenters, audience members, awardees, etc.). Embodiments not only reduce the errors in pronouncing people's name live, but also saves time in learning each individual's name pronunciation.

Embodiments may be integrated into existing conference tools, such as (e.g., Zoom, Google Meet, Cisco Webex, BlueJeans, Microsoft Teams, etc.) where people can freely address each other without hesitation or awkwardness in a live.

Embodiments may be integrated into customer management/engagement tools (e.g., calendar, email, message/communication platform, phone book, client database, booking system, CRM systems, etc.).

Figure 1:
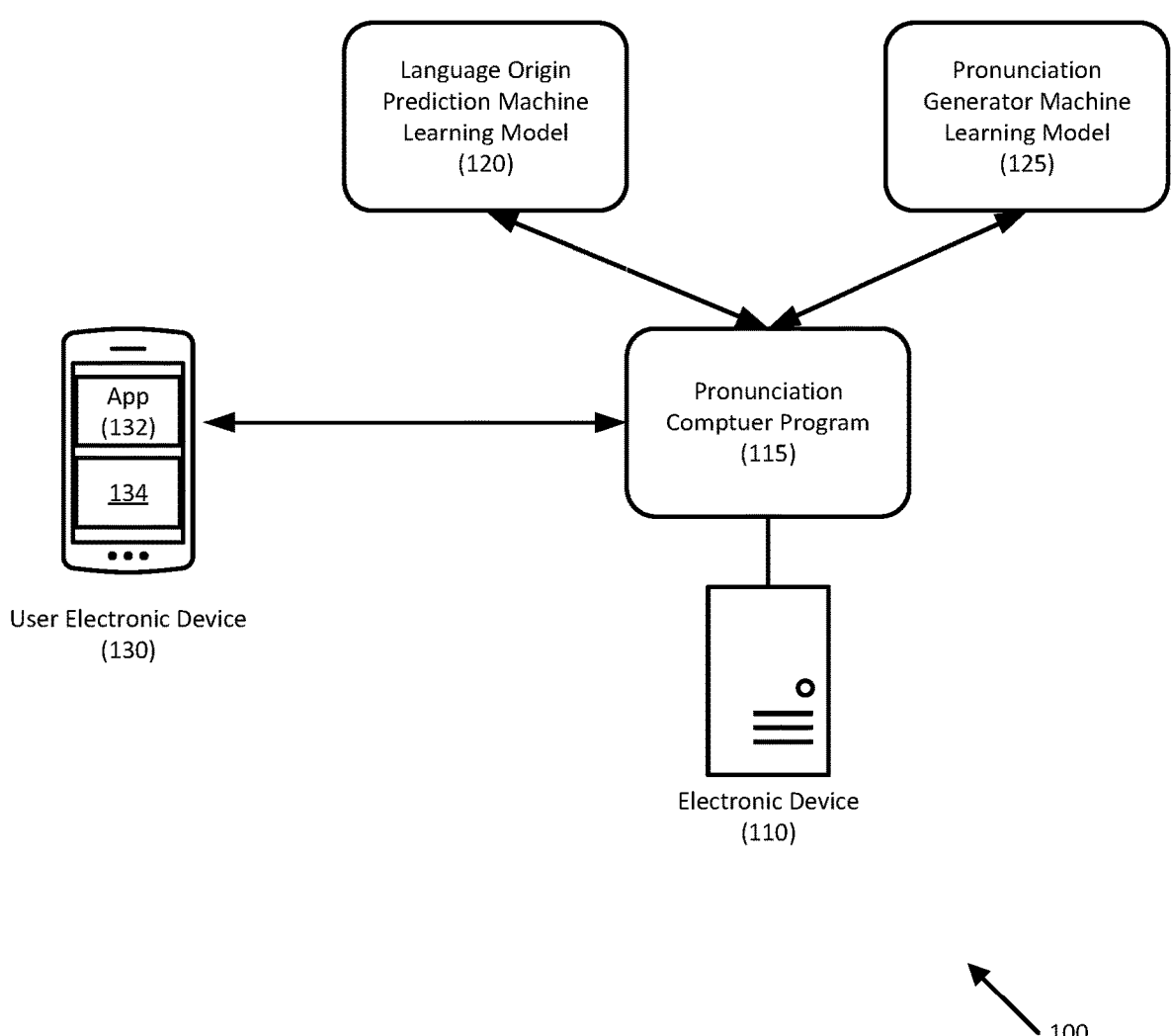
FIG. 1 depicts a system for machine-learning based multi-lingual pronunciation generation according to an embodiment.

Referring to FIG. 1, a system for machine-learning based multi-lingual pronunciation generation is disclosed according to an embodiment. System 100 may include electronic device 110, which may be any suitable electronic device, such as servers (e.g., cloud-based and/or physical), computers (e.g., workstations, desktops, laptops, notebooks, tablets, etc.), smart devices (e.g., smartphones, smart watches, etc.), Internet of Things (IoT) appliances, etc. Electronic device 110 may execute pronunciation computer program 115, which may be a computer program or application that may return a pronunciation of a name, word, etc. In one embodiment, pronunciation computer program 115 may be a distributed application which may be distributed to other electronic devices, such as user electronic device 130.

Pronunciation computer program 115 may receive a word (e.g., a name, word, etc.) for pronunciation guidance from application 132 executed by user electronic device 130. For example, a user may enter the text of a word into application 132 and pronunciation computer program 115 may first predict a language origin of the word, and then, using the language origin, may predict the pronunciation of the word. In one embodiment, pronunciation computer program 115 may predict the language origin of the word using language origin prediction machine learning model 120. Language origin prediction machine learning model 120 may be a machine learning model that is trained using, for example, supervised training, using historical data, and then validated.

In one embodiment, language origin prediction machine learning model 120 may include a natural language processing task based on "text classification." Text classification may output an intended categorical label (e.g., noun/verb, name/place/actions) given the input text. The categorical label here may be a language.

Pronunciation generator machine learning model 125 may be used to predict the pronunciation of the word based on the predicted language origin. Pronunciation generator machine learning model 125 may be a machine learning model that is trained using, for example, supervised training, using historical data, and then validated. Pronunciation generator machine learning model 125 may be trained to learn pronunciations at the syllable level.

Pronunciation generator machine learning model 125 may use a sub-component of a text-to-speech (TTS) model (i.e., grapheme to phone model) which generates pronunciation tokens of each segmented parts in a given word. The pronunciation generator machine learning model 125 may be trained monolingually; thus, a separate pronunciation generator machine learning model 125 may exist for each language.

In one embodiment, language origin prediction machine learning model 120 and/or pronunciation generator machine learning model 125 may comprise neural networks.

Once the pronunciation is predicted, pronunciation computer program 115 may return the pronunciation to application 132, which may be displayed for the user.

In one embodiment, pronunciation computer program 115 may expose an application programming interface (API) for application 132.

In one embodiment, user electronic device 130 may include pronunciation computer program 115, language origin prediction machine learning model 120, and/or pronunciation generator machine learning model 125. Language origin prediction machine learning model 120, and/or pronunciation generator machine learning model 125 may be periodically updated by a backend (not shown). Thus, user electronic device 130 may not need to access any external computer programs to return a pronunciation prediction.

User electronic device 130 and/or pronunciation computer program 115 may also include audio pronunciation application 134, which may be a text-to-speech model. In another embodiment, audio pronunciation application 134 may include a mapping of pronunciation predictions to audio. To make the audio generation available to a wider range of languages with diverse pronunciation rules, embodiments may leverage pronunciation representation systems such as the International Phonetic Alphabet (IPA), the Advanced Research Projects Agency phonetic transcription (ARPABET), the speech assessment methods phonetic alphabet (SAMPA), etc.

Audio pronunciation application 134 may output audio of the pronunciation prediction to the user. The audio may be provided syllable-by-syllable, or it may output the pronunciation prediction of the entire word. In one embodiment, audio pronunciation application 134 may be trained with feedback from the user.

Referring to FIG. 2, a method for machine-learning based multi-lingual pronunciation generation is provided according to an embodiment.

In step 205, a language origin prediction machine learning model may be trained. For example, the language origin prediction machine learning model may be trained using historic data using for example, supervised learning.

In step 210, a pronunciation generator machine learning model may be trained. For example, the pronunciation generator machine learning model may also be trained with historic data using for example, supervised learning.

In step 215, a user may submit a word for pronunciation guidance. In one embodiment, the word may be a name. The user may submit the word to an application executed by a user electronic device. In one embodiment, the application may be a stand-alone application that may incorporate the trained machine learning models referenced above. The computer program may also be integrated into another program, such as a video conferencing computer program.

In step 220, a pronunciation computer program, which may be executed by the user electronic device, or a centralized computer program, or a distributed application, may predict the language origin of the word using the trained language origin prediction machine learning model. The language origin prediction machine learning model may provide a probability of language origins, and the pronunciation computer program may select the language origin with the highest score.

In step 225, the pronunciation computer program may predict the pronunciation using the trained pronunciation generator machine learning model. The trained pronunciation generator machine learning model may return the pronunciation prediction pronunciation at the syllable level.

In one embodiment, the pronunciation computer program may select the trained pronunciation generator machine learning model for the language identified by the trained language origin prediction machine learning model.

In step 230, the pronunciation computer program may return the pronunciation prediction to the user via the application. The pronunciation prediction may be returned as text, for example, a phonemic pronunciation, a phonetic pronunciation, phonemes, transliterations, etc. These pronunciation aids (i.e., the output) may be derived from the symbolic phonetic representations that are traditionally used for speech synthesis.

In another embodiment, the pronunciation computer program may return the pronunciation prediction as audio using, for example, a text-to-speech model, a mapping of pronunciation prediction to audio, etc. The pronunciation predictions may be mapped to the mainstream symbolic phonetic representations that are generally used for speech synthesis. To make the audio generation available to a wider range of languages with a diverse pronunciation rules, embodiments may leverage pronunciation representation systems, such as IPA, ARPABET, SAMPA etc. In one embodiment, the audio may be output on a speaker or associated with the user electronic device (e.g. internal or external).

In step 235, the pronunciation computer program may receive feedback from, for example, the user application, and may update (e.g., retrain) the language origin, pronunciation models, the text-to-speech model, and/or the mapping of pronunciation prediction to audio based on the feedback.

Figure 3:
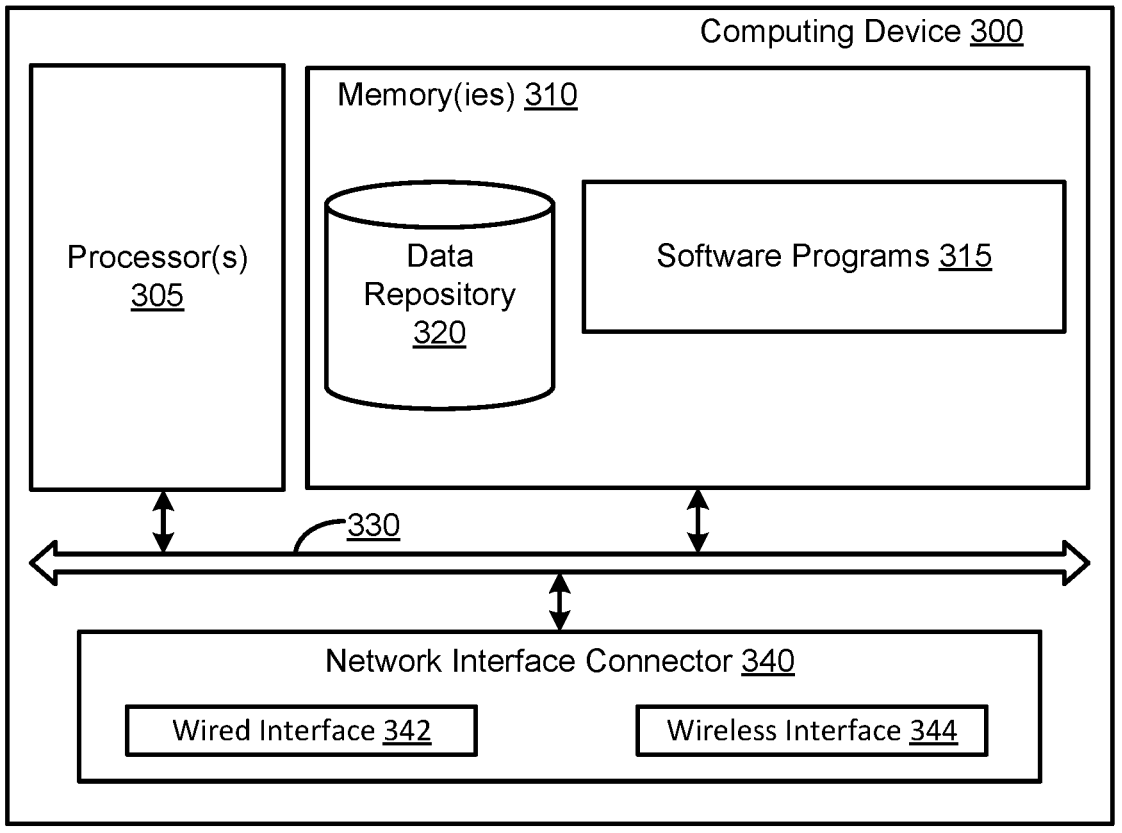
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Additional details may be found in the Appendix, which is incorporated herein, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for machine-learning based multi-lingual pronunciation generation, comprising:

training a language origin prediction machine learning model;

training a plurality of pronunciation generator machine learning models, wherein each of the trained pronunciation generator machine learning model is specific to a language origin;

receiving, by a pronunciation computer program, a word for pronunciation guidance;

predicting, by the pronunciation computer program and using the trained language origin prediction machine learning model, a language origin of the word;

selecting, by the pronunciation computer program, one of the plurality of trained pronunciation generator machine learning models for the predicted language origin;

predicting, by the pronunciation computer program and using the selected trained pronunciation generator machine learning model, a syllable-by-syllable pronunciation for the word; and returning, by the pronunciation computer program, the syllable-by-syllable pronunciation.

2. The method of claim 1, wherein the word is a name.

3. The method of claim 1, wherein the language origin prediction machine learning model and/or the pronunciation generator machine learning model are trained using supervised learning.

4. The method of claim 1, further comprising:

receiving, by the pronunciation computer program, feedback; and re-training the language origin prediction machine learning model and/or the pronunciation generator machine learning model using the feedback.

5. The method of claim 1, wherein the word is received at an application executed by a user electronic device that is in communication with the pronunciation computer program.

6. The method of claim 5, wherein the application outputs audio of the syllable-by-syllable pronunciation.

7. The method of claim 5, wherein the application outputs text of the syllable-by-syllable pronunciation.

8. The method of claim 1, wherein the pronunciation computer program is integrated into a videoconferencing computer program.

9. A system, comprising:

a trained language origin prediction machine learning model;

a plurality of trained pronunciation generator machine learning models, wherein each of the trained pronunciation generator machine learning model is specific to a language origin; and an electronic device executing a pronunciation computer program that is configured to receive a word for pronunciation guidance, to predict using the trained language origin prediction machine learning model, a language origin of the word, to select one of the plurality of trained pronunciation generator machine learning models for the predicted language origin, to predict, using the selected trained pronunciation generator machine learning model, a syllable-by-syllable pronunciation of the word, and to output the syllable-by-syllable pronunciation.

10. The system of claim 9, wherein the word is a name.

11. The system of claim 9, wherein the trained language origin prediction machine learning model and/or the trained pronunciation generator machine learning model are trained using supervised learning.

12. The system of claim 9, wherein the pronunciation computer program is further configured to receive feedback and to retrain the trained language origin prediction machine learning model and/or the trained pronunciation generator machine learning model using the feedback.

13. The system of claim 9, further comprising:

a user electronic device executing an application, wherein application is configured to receive the word.

14. The system of claim 13, wherein the application outputs audio of the syllable-by-syllable pronunciation on a speaker.

15. The system of claim 13, wherein the application outputs text of the syllable-by-syllable pronunciation on a display.

16. The system of claim 9, wherein the pronunciation computer program is integrated into a videoconferencing computer program.

* * * * *